US005475286A

United States Patent [19]
Jackson et al.

[11] Patent Number: 5,475,286
[45] Date of Patent: Dec. 12, 1995

[54] DEFLECTION WAVEFORM CORRECTION CIRCUIT

[75] Inventors: David R. Jackson, Indianapolis; Kenneth J. Helfrich, Fishers, both of Ind.

[73] Assignee: Thomson Consumer Electronics, Inc., Indianapolis, Ind.

[21] Appl. No.: 99,377

[22] Filed: Jul. 29, 1993

[30] Foreign Application Priority Data

Sep. 4, 1992 [GB] United Kingdom .................... 9218735

[51] Int. Cl.$^6$ .............................. G09G 1/04; H01J 29/56
[52] U.S. Cl. ............................................................ 315/371
[58] Field of Search .................................. 315/370, 371, 315/393, 395

[56] References Cited

U.S. PATENT DOCUMENTS

| | | | |
|---|---|---|---|
| 2,758,248 | 8/1956 | Garrett et al. | 315/15 |
| 3,944,879 | 3/1976 | Suzuki | 315/370 |
| 4,093,895 | 6/1978 | Collette | 315/371 |
| 4,220,898 | 9/1982 | den Hollander | 315/371 |
| 4,469,992 | 9/1984 | Favreau et al. | 315/371 |
| 4,687,972 | 8/1987 | Haferl | 315/371 |
| 4,965,495 | 10/1990 | Wilber et al. | 315/371 |
| 4,968,919 | 11/1990 | Oliver | 315/371 |
| 5,043,637 | 8/1991 | Gries et al. | 315/371 |

OTHER PUBLICATIONS

Sony Training Manual for ANU–2 Chassis, Cover, frontis piece and pp. 26, 27, 30 and 31.
Sony Service Manual for ANU–2 Chassis Model KV–27EXR95, pp. 1, 49 & 68, Dated 1992.
Sony Service Manual for ANU–1 Chassis, Model KV–32HSR10, pp. 1, 35, 36 & 68 Dated 1989.
Thorn 9500 Series Colour Television Service Manual, published by Thorn Consumer Electronics Service Division, dated Dec. 1977, p. 28.
Thorn 9000 Series Colour Television Service Manual, published by Thorn Consumer Electronics Service Division, dated Nov. 1975, p. 19.
Schematic of the Deflection and Power Supply Circuit in the Metz Color 7400 Series Television Receivers, Chassis 684 G–1.
U.S. Application Ser. No. 099,301 Pat. #5,323,092.
U.S. Application Ser. No. 099,376.

*Primary Examiner*—Gregory C. Issing
*Attorney, Agent, or Firm*—Joseph S. Tripoli; Joseph J. Laks; Francis A. Davenport

[57] ABSTRACT

A deflection apparatus comprises a deflection amplifier coupled to a deflection waveform modulation circuit such as a diode modulator. A source for generating a modulation signal. The modulation signal comprises a symmetrical periodic AC component having equal first and second portions of a trace period. A feedback amplifier alters the amplitude of a first portion of the trace period relative to a second portion of the trace period to render the AC component asymmetrical. The asymmetrical AC component is coupled to the deflection waveform modulation circuit for deflection waveform modulation.

19 Claims, 4 Drawing Sheets

DEFLECTION WAVEFORM CORRECTION CIRCUIT

BACKGROUND OF THE INVENTION

This invention relates to the field of cathode ray tube deflection amplitude control, such as East-West waveform correction of deflection signals generated by a bus controlled integrated circuit.

The development of single integrated circuits containing both analog and digital television signal processing has greatly reduced receiver parts count, improved reliability and reduced manufacturing cost. Such integrated circuits frequently employ sync separation circuitry to lock a reference oscillator from which horizontal and vertical rate deflection signals are developed. To facilitate control of the I.C. functions with a minimum of circuit board potentiometers and to minimize the I.C. pin count, the integrated circuit may be controlled via a data bus. An example of a data bus system is the Thomson logic protocol which comprises three control lines, data, clock and enable respectively. The I.C. usually contains registers which store digital values that correspond to setup, alignment or user determined values for specific parameters. The stored digital data is converted to an analog value by a digital to analog converter. This analog value is coupled out of the I.C. to control the specific parameter in external circuitry.

To reduce the I.C. pin count, certain waveforms and control signals may output on common I.C. pins. For example, a horizontal pincushion correction waveform, namely a vertical rate parabola, may be output together with a horizontal width determining DC voltage. Thus a single IC pin is used for two circuit control functions. The selection of horizontal pincushion, and horizontal width control parameters is advantageous since both parameters may be controlled by a common deflection circuit configuration, for example a pulse width modulator coupled to a pincushion diode modulator. Thus the vertical rate parabola may be superimposed on a horizontal width determining DC voltage. However, this composite control signal requires DC coupling to the point of circuit control. Furthermore, control requirements may exist for certain deflection yoke/tube combinations which require control signal amplitudes which tend to exceed the output voltage swing capability of the multifunction I.C. Hence constraints exist within the I.C. which limit the maximum amplitude ratio of the two control signals. Additional constraints exist within the I.C. in terms of the range of digital control, i.e. number of control data bits, and the consequential size requirements for control value memory.

SUMMARY OF THE INVENTION

A deflection apparatus comprises a horizontal deflection amplifier and a vertical deflection amplifier for generating deflection currents in respective deflection coils during respective trace and retrace intervals for electron beam deflection to form a scanned raster having asymmetrical pincushion distortion. A deflection waveform modulation circuit is coupled to the horizontal deflection amplifier. A source for generating a periodic symmetrical AC modulation signal is coupled to a means for differentially altering an amplitude of the AC signal during a first portion of each vertical trace period relative to an amplitude of said AC signal during a second portion of each vertical trace period to generate an altered amplitude AC signal. The altered amplitude AC signal is coupled to the waveform modulation circuit to form said raster where the asymmetrical pincushion distortion is generally corrected.

DETAILED DESCRIPTION

Figure 1:
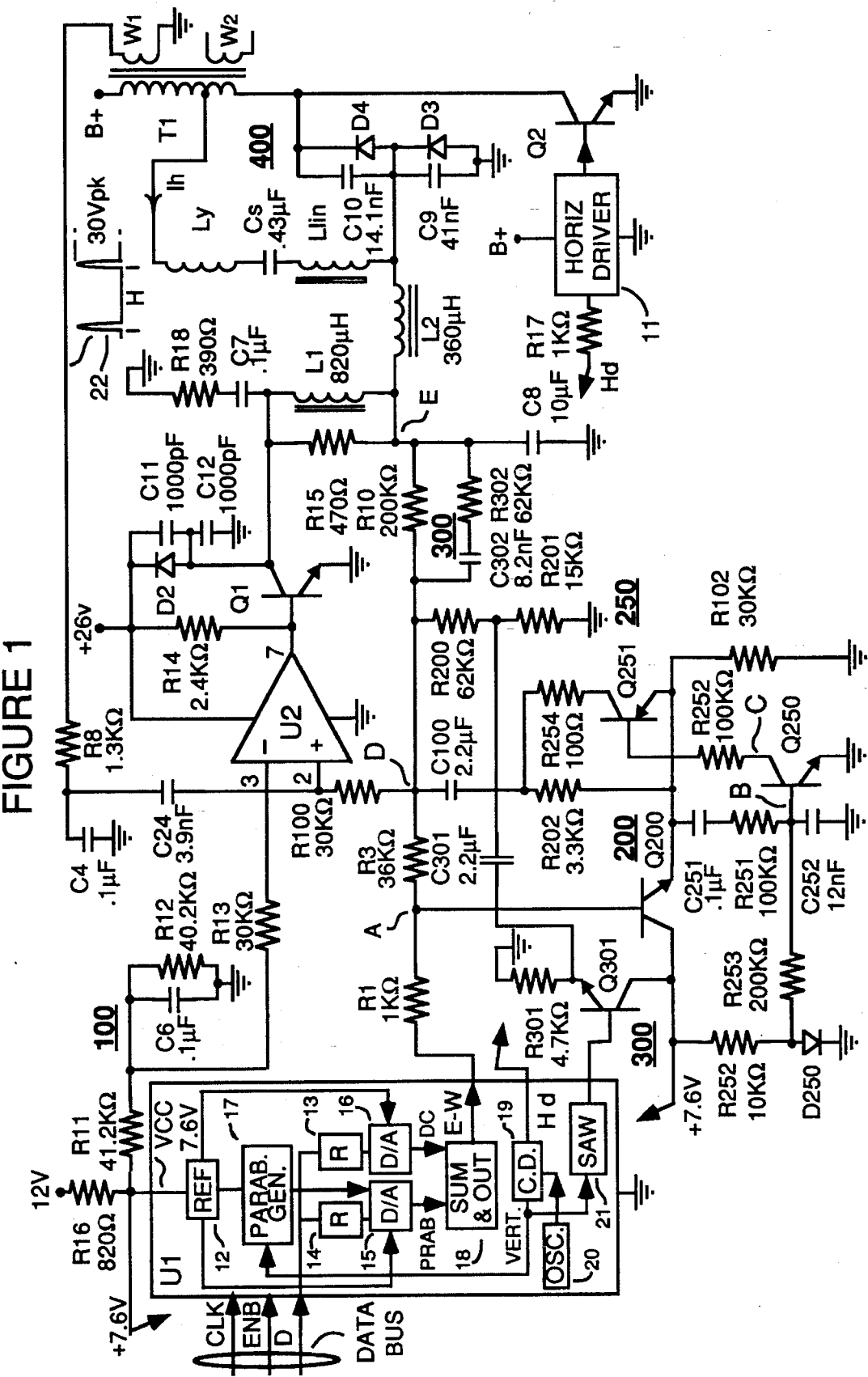
FIG. 1 is a circuit diagram of a horizontal deflection circuit with waveform correction according to various inventive arrangements described herein.

FIG. 1 shows a horizontal deflection circuit based on the use of an integrated circuit U1, which contains a multiplicity of analog and digital television circuit functions. Integrated circuit U1 generates a horizontal rate signal Hd, which is coupled via a driver stage to a horizontal output transistor Q2. Transistor Q2 is coupled to output transformer T1 which has a primary winding tapped to drive a deflection winding Ly. Output transformer T1 has secondary windings W1 and W2. Winding W1 generates a retrace pulse of about 30 volts peak. Winding W2 is coupled to a high voltage ultor power supply generator (not shown). East-West, or pincushion deflection waveform correction is provided by a diode modulator 400. The diode modulator is coupled to the deflection winding Ly and effectively varies the current through the winding in a parabolic manner at vertical rate. Transistor Q1 functions as a saturated switch coupled to the diode modulator and responsive to a horizontal rate, variable width pulse, generated by voltage comparator U2. An input of comparator U2 sums a vertical rate parabola with a DC component from integrated circuit U1, together with an integrated horizontal retrace pulse from transformer T1 winding W1. This composite waveform is compared against a reference potential applied to a second comparator input and results in a comparator output signal having a horizontal rate pulse with a width that varies responsive to the vertical rate parabola.

Integrated circuit U1 is controlled by a microcomputer system (not shown) via three input lines, namely serial data, clock pulse and an enable signal. The serial data employs a Thomson logic protocol. Integrated circuit U1, contains an oscillator OSC 20, operating at 32 times horizontal frequency. This oscillator is phase locked (not shown in FIG. 1), to a horizontal sync signal from a selected video source, ie either base band video input or a sync signal demodulated from an RF modulated source. A count down circuit CD 19, produces both horizontal and vertical rate waveforms. A horizontal rate signal Hd, is coupled from IC U1 via a resistor R16, to a horizontal driver stage 11. The horizontal driver is coupled the base of a horizontal output transistor Q2. The emitter of transistor Q2 is grounded and the collector is coupled to a B+ power supply via output transformer T1. Transformer T1 has a primary winding with a tap for driving a horizontal deflection coil Ly. Transformer T1 has a secondary winding W1 which generates a retrace pulse 22 of approximately 30 volts which is coupled via resistor R8, to a summing network at an input of comparator U2. Transformer winding W2 is coupled to an ultor power supply which is not shown. The horizontal deflection coil Ly, is coupled in series with an "S" correction capacitor Cs and a linearity correction inductor Llin.

Pin cushion or East-West deflection correction is produced by diode modulator 400. The diode modulator is formed by diodes D3 and D4 coupled in series with each other and in parallel with series combination of capacitors C9 and C10 respectively. Diode D4 cathode is coupled to the collector of transistor Q2. Diode D4 anode is joined to the cathode of diode D3 and the junction point is coupled to linearity inductor Llin. The junction of diode D3 cathode, and capacitors C9, C10 are coupled via an inductor L2 to the junction of inductor L1 and capacitor C8. A inductor L1 is bridged by a damping resistor R15. Capacitor C8 decouples the horizontal rate pulse current to ground and develops a vertical rate parabolic waveform voltage responsive to the parabolic width modulation of the horizontal pulse.

The collector of transistor Q1 is coupled to a resistor R18 and a capacitor C7 coupled in series to ground. This network, also known as a "snubber", dissipates inductive switching transients produced by inductor L1 at the cessation of current flow in transistor Q1. The time constant of resistor R18 and capacitor C7 is selected to slow the rise of transistor Q1 collector voltage at transistor switch off. Diode D2 anode is connected to the collector of transistor Q1, the cathode being connected to the voltage supply. Thus diode D2 is normally reverse biased by the 26 volt supply. However, when transistor Q1 switches off, the positive voltage transient produced by inductor L1 turns on diode D2, clamping the transient and conducting the inductive current into the 26 volt supply. Thus diode D2 and the "snubber" network formed by capacitor C7, and resistor R18 prevent over dissipation and failure of transistor Q1. Capacitors C11 and C12 bypass high frequencies to prevent the generation of radio frequency harmonics resulting from transistor Q1 switching. Transistor Q1 collector is also coupled via resistor R10 to provide negative feedback to the summing point at the non-inverting input of voltage comparator U2.

The inverting or negative input of voltage comparator U2 is advantageously coupled to a positive reference potential generated potential divider 100. The reference potential coupled to the inverting input of voltage comparator U2 is derived by potential division of a 7.6 volt reference regulator within IC U1. This reference voltage is available at a dropping resistor R16 coupled between the IC and the 12 volt supply. The 7.6 volt reference is coupled to a potential divider formed by a series combination of resistors R11 and R12 with resistor R12 coupled to ground. The junction of the resistors produces approximately 3.75 volts which is decoupled to ground by capacitor C 6. The junction of the resistors is also coupled via series resistor R13 to the inverting input of comparator U2.

The positive input of comparator U2 is connected to network 200 which, in conjunction with negative feedback via resistor R10 sums a vertical rate parabolic waveform and DC component, coupled via resistors R1, R3 and R100, with a horizontal rate ramp. A horizontal ramp is formed across capacitor C4 by integration or the retrace pulse coupled via resistor R8 from winding W1 of transformer T1. Expressed in simple terms, the result of the summation is a horizontal ramp superimposed on the field rate parabola. When the waveform sum applied to the non-inverting input is less than the reference potential applied to the inverting input of comparator U2, the comparator output remains at close to ground potential. Thus the comparator output circuitry sinks current from the 26 volt supply via resistor R14, holding transistor Q1 non-conductive. When the waveform sum exceeds the reference voltage set at the negative input of comparator U2, the output switches from ground, allowing current via resistor R14, to supply the base of transistor Q1 causing it to turn on.

The DC component of the vertical parabola establishes an average value for the parabola and hence sets the average horizontal deflection amplitude or width. The parabola component causes the integrated horizontal flyback pulse to move across the comparator switching threshold following the parabolic waveshape. Hence the comparator output comprises a horizontal rate pulses having widths which vary responsive to the vertical parabola. The parabolic waveform component at transistor Q1 collector is integrated and low pass filtered by inductor L1 and capacitor C8 which provide pincushion correction current to diode modulator 400 via inductor L2.

The collector of transistor Q1 coupled via inductor L1 and horizontal frequency decoupling capacitor C8 to resistor R10 which provides negative feedback to the waveform summing point. Comparator U2 is a switching amplifier operating in the class D mode. At low frequencies, for example, at the parabolic signal frequency, a negative feedback loop is provided by resistor R10 to the non-inverting input of the comparator U2. Comparator U2 may be alternatively configured as a linear class A amplifier to drive a linear diode modulator. An inventive network formed by the series combination of resistor R302 and capacitor C302 is coupled in parallel with resistor R10 provide frequency selective feedback to the summing point D.

Integrated circuit U1 is controlled via a data bus as shown in FIG. 1. The data bus comprises three signals, data D, clock CLK and enable ENB. During receiver setup, adjustments are made to various parameters using a microprocessor controller not shown, and the adjustment value is sent to IC U1 via the data bus as digital data. The digital data is received and stored in a register R. For example, the amplitude value of the East-West parabolic signal is determined by 3 data bits which are stored in register 14. The DC width signal is determined by 4 data bits, which for example, are stored in register 13. A vertical rate parabolic signal is generated by a PARAB GEN. 17 using a signal, VERT., produced by a count down circuit 19. The vertical signal VERT from the count down circuit is also used to generate a sawtooth signal 21. The parabola signal is controlled in amplitude responsive to the value of the control data word stored in register 14. The data word from memory register 14 is applied to a digital to analog converter 15 configured as an R-2R ladder where it controls the parabola amplitude. The parabolic signal is coupled to a summing amplifier 18. Horizontal deflection width is determined by a DC voltage applied to a pulse width modulator U2. This DC voltage is generated within IC U1 by a digital to analog converter 16, configured as an R-2R ladder. The width determining DC is generated by converter 16 responsive to 4 bit control data from register 13, and can have one of 16 possible DC values. Converters 15 and 16 are powered from the 7.6 volt reference regulator 12, within IC U1. This voltage regulator is referenced to an internal band gap voltage reference and is configured to utilize an external dropping resistor R16, coupled to a 12 volt supply. Thus any variations in the 7.6 volt reference regulator 12 will be common to both the amplitude determining D to A converter and correction signal generated thereby. The summing block 18 combines the parabolic signal and the DC width voltage which are then output as the East-West correction signal. Hence, to preserve the DC component of the East-West correction signal, DC coupling is required to the point of horizontal width control, comparator U2.

It is desirable that IC U1 should be usable across a range of TV receiver products with various screen sizes, screen surface geometries and deflection yoke assemblies. To achieve such universality requires a greater range of control for many deflection related parameters. Clearly an IC may be designed to have broader control ranges but this incurs penalties of increased IC die area or size, increased IC power dissipation and increased data storage requirements for setup parameters. Hence by utilizing circuitry external to integrated circuit U1, deflection parameters are provided which are compatible with a range of TV receiver products.

FIG. 1 shows component values employed in a color TV receiver with a 31 inch cathode ray tube, to center the control ranges for pincushion correction and horizontal width control, and also to provide control range consistent with the control value quantization i.e. the absolute voltage step for each data bit change. The horizontal width determining DC component of the East-West correction signal is controlled in amplitude by 4 data bits, i.e. the voltage may have one of 16 possible values. Within I.C. U1 the 4 data bits are coupled to a digital to analog converter which generates the width determining DC voltage. The digital to analog converter is of the R-2R ladder configuration. The parabolic component is controlled in amplitude by 3 data bits and is combined with the DC component and coupled out of I.C. U1. The maximum correction signal amplitudes are determined by a 7.6 volt regulator within I.C. U1. It is possible to visualize a correction signal condition where maximum values of both the DC component and the parabola are required, however, the combined voltage swing is limited by the supply voltage set by the internal regulator. Certain combinations of deflection components may require that the absolute change in DC voltage, or wavform amplitude corresponding to a single control data bit be changed to increase or decrease the operational sensitivity of the control function. For example the DC component, which is controlled by 4 data bits, may exhibit granularity where the required DC voltage (horizontal width) can not be achieved since a single data bit change steps the DC beyond the desired setup value. The DC component and vertical parabola waveform resulting from set up are combined and have a certain amplitude ratio one to the other. The combined signal is then coupled out of I.C. U1. To achieve the desired utilization of integrated circuit U1 across a range of TV products an inventive active AC/DC attenuator 200 is employed which produces differing attenuations of the AC and DC component of the East-West correction signal.

The East-West signal is directly coupled to summing point D via a DC potential divider formed by series resistors R1, R3 and the parallel combination of summing point resistors R200, R201 and R10. This potential divider attenuates the DC component of the signal by approximately 40%. The AC component, fed via the directly coupled path, is more severely attenuated as a consequence of the series connected AC coupled path to the emitter of transistor Q200. The emitter impedance of transistor Q200, in series with resistor R202 and capacitor C100, effectively bypass the AC component coupled via DC potential divider.

The East-West signal is also coupled to the base electrode of emitter follower transistor Q200. Emitter follower Q200 has the collector electrode connected to the +7.6 volt reference supply and the emitter connected to ground via resistor R102. The emitter terminal of emitter follower Q200 is AC coupled to the summing point via a series combination of resistor R202 and capacitor C100. The output impedance of emitter follower Q200 and resistor R202 form an attenuator with the summing point resistors. This attenuator attenuates the AC coupled East-West parabolic waveform by approximately 5%.

The amplitude ratio of the parabolic and DC components may also be altered by amplification. An amplifier may be included in the path of either or both components to provide the desired change in amplitude ratio.

The variously attenuated components are combined at the summing point and result in a DC component of 60% amplitude and a parabolic component of 95% amplitude. Thus, inventive active circuit 200 introduces a difference in amplitude between the components of the original East-West signal. Expressed in ratiometric terms, assuming for example that the signal components of the original East-West had a ratio of 1:1, active circuit 200 modifies the ratio to 1.58:1. Thus, the DC component control step size is approximately halved, effectively reducing the granularity of the 4 bit control signal. However the parabolic component control step size is virtually unchanged and is essentially as determined by D to A 15 within I.C. U1.

The introduction of new tube face geometries, for example, flatter tubes, introduce pincushion distortion which is correctable with a modified parabolic signal. A modified parabola is produced by inventive active circuit 250 of FIG. 1. Circuit 250 dynamically varies the attenuation in the AC coupled path in response to the parabolic waveform. As described above, the East-West signal at the emitter of transistor Q200 is also coupled via series connected resistor R251 and capacitor C251 to the base of transistor Q250. The emitter of transistor Q250 is grounded and the collector electrode is coupled via resistor R252 to the base of transistor Q251. The base of transistor Q250 is also connected to the junction of resistor R253 and capacitor C252 which is connected to ground. Capacitor C252 provides a phase delay to compensate for phase shift in the series path of resistor R253 and capacitor C252. Resistor R253 is coupled to the junction of series connected resistor R252 and the anode of silicon diode D250. Resistor R252 is coupled to the reference +7.6 volt supply which forward biases diode D250 and supplies a current to ground. Resistor R253 couples the voltage across diode D250 to point B at the base of transistor Q250. The positive voltage at point B allows a positive center part of the parabolic signal, coupled via series connected resistor R251 and capacitor C251, to turn on transistor Q250. The actual part of the parabola which turns on transistor Q250 is determined by resistors R251 and R253. When transistor Q250 turns on, base current is provided via resistor R252 to PNP transistor Q251, which turns on. The value of resistor R252 is chosen to provide a smooth turn on of transistor Q251 thus avoiding sharp discontinuities in the modified parabola waveform. When transistor Q251 turns on, resistor R254 is connected in parallel with resistor R202 and effectively eliminates the attenuation resulting therefrom. Thus, resistor R202 is effectively bypassed by resistor R254, with result that the amplitude of the parabolic component is dynamically increased during the center part of the parabola.

Certain yoke/tube combinations may exhibit vertical trapezoidal distortion of the scanned raster, for example, the displayed horizontal line length progressively changes between the top and bottom of the display. Other geometrical distortions may also exist for example, power supply load variations resulting from other deflection circuitry may influence horizontal deflection amplitude resulting in vertical asymmetry of horizontal pincushion distortion. The vertical positioning or phasing of the correction signal may require adjustment to position the corrective effect in the mechanical center of the display surface.

Figure 2:
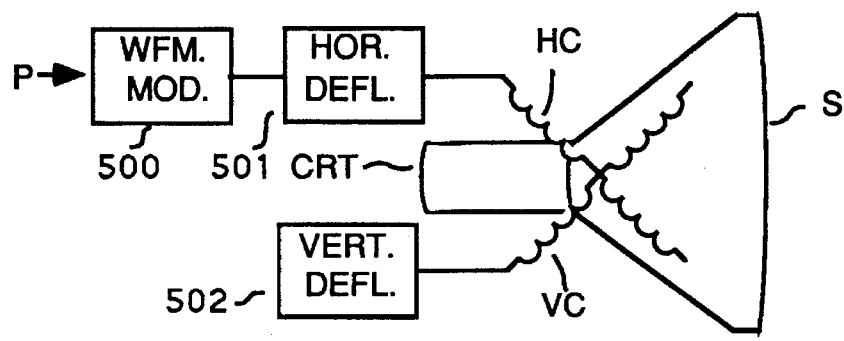
FIG. 2A shows the correction of a distorted raster.
FIG. 2B shows a raster with asymmetrical distortion.
FIG. 2C shows symmetrical correction of a raster with asymmetrical distortion.
Figure 2:
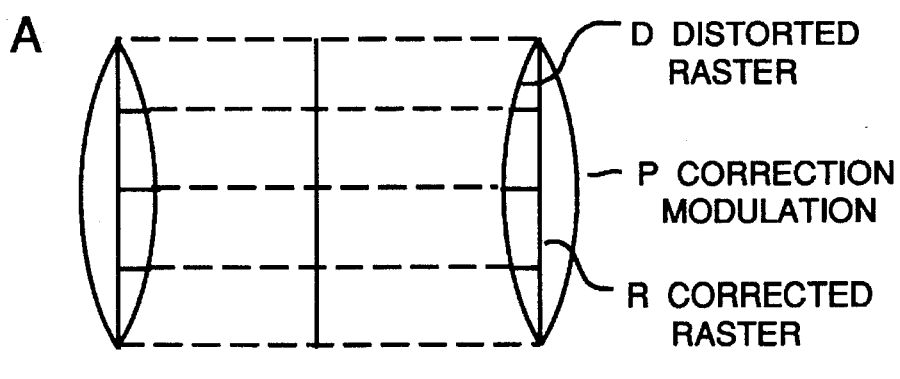
Figure 2:
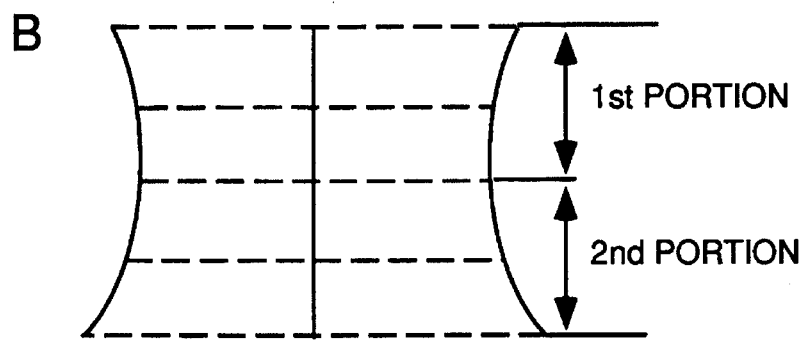
Figure 2:
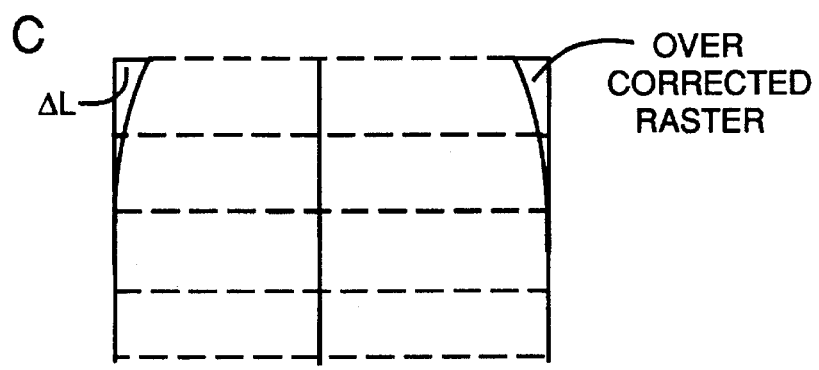

FIG. 2 shows a cathode ray tube CRT, with horizontal and vertical deflection coils. The horizontal coils HC, are coupled to a horizontal deflection amplifier 501 which is coupled to a deflection waveform modulator 500. The vertical deflection coils VC, are coupled to a vertical deflection amplifier 502. The respective deflection amplifiers develop currents in the respective coils producing a scanned raster on the display surface S of the cathode ray tube. FIG. 2A shows a distorted raster D scanned on surface S, which is subject to corrective deflection amplitude modulation by a vertical rate parabola P. The vertical rate parabolic correction produces a corrected, generally rectangular raster R. The distorted raster D is symmetrically distorted about the vertical center of the raster. A symmetrical correction modulation signal, for example a vertical rate parabola P, will provide symmetrical deflection width correction to produce the rectangular raster R. However, a combination of errors may combine and result in a raster having a vertically asymmetrical pincushion distortion, for example as shown in FIG. 2B. The asymmetrical pincushion distortion in 2B shows a first portion of vertical trace where the distortion is different from a second portion of vertical trace. Deflection amplitude correction with the symmetrical parabola P of FIG. 2A will result in over correction ΔL at the top of the raster as shown in FIG. 2C. Thus an asymmetrical correction signal is required, which must provide differing amounts of correction in the first and second portions of the correction signal.

Figure 3:
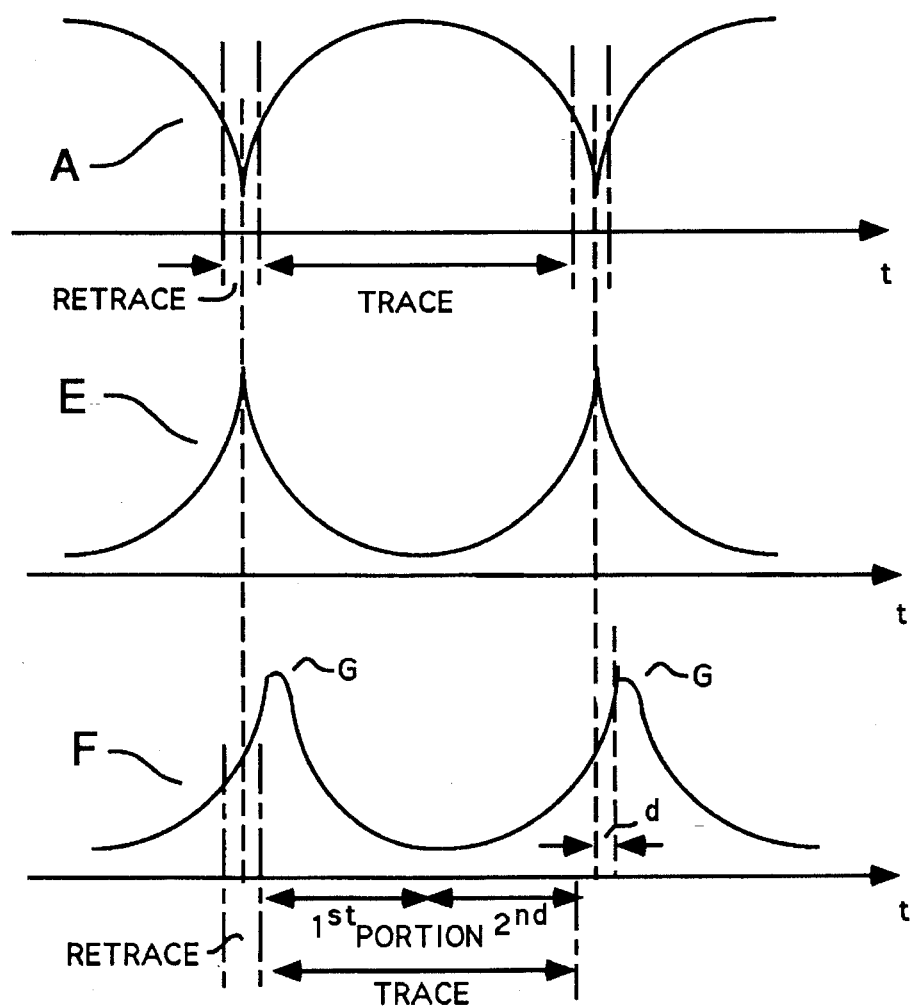
FIG. 3A shows the parabolic component at point A.
FIG. 3E shows the parabolic component at point E, without network 300.
FIG. 3F shows the parabolic component at point E, with asymmetry due to network 300.

Such asymmetrical variations of horizontal deflection distortions are advantageously corrected by inventive circuits 300. A frequency selective network is formed by the series combination of resistor R302 and capacitor C302 which are coupled in parallel with feedback resistor R10. The parallel combination of resistor R302 and capacitor C302 and feedback resistor R10 produce negative feedback which increases with increasing frequency. FIG. 3A depicts a parabolic waveform at point A of FIG. 1. The parabolic waveform depicted in A of FIG. 3 is symmetrically disposed during the combined vertical trace and retrace intervals with the parabolic cusps occurring symmetrically during the retrace interval, or period. This signal is amplified and inverted by transistor Q2. FIG. 3E shows the signal at point E of FIG. 1 without selective feedback. The selective feedback produced by resistor R302 and capacitor C302, introduces phase shift or delay to the parabolic signal component developed by capacitor C8. The delay resulting from the selective feedback is depicted by "d" in waveform F, for example 1 millisecond, which represents the time difference between waveforms A and F, of FIG. 3. Additionally the frequency dependent feedback selectively modifies the shape of the parabolic cusp, corresponding to the top of the raster. This asymmetrical shaping is shown at G in waveform F of FIG. 3, and may be explained as a consequence of the frequency dependent feedback resulting in different phase shifts, or time delays, for higher frequency components of the correction parabola. Thus the use of selective feedback advantageously introduces asymmetry to the parabolic correction signal.

In FIG. 1 a transistor emitter follower Q301 has a base terminal coupled to a vertical rate sawtooth signal generated by IC U1. The emitter terminal is AC coupled via a capacitor C301 to summing resistors R200 and R201. Thus the sawtooth signal at the emitter of transistor Q301 is potentially divided by resistor R201 and the series combination of resistor R200 and the parallel network formed by resistors R10, R3. The vertical sawtooth is added to the composite signal at point D and may be considered to impart a vertical tilt to the vertical parabolic signal. This tilt results in a progressive lengthening or shortening of the horizontal display line over the duration of the vertical sawtooth.

Figure 4:
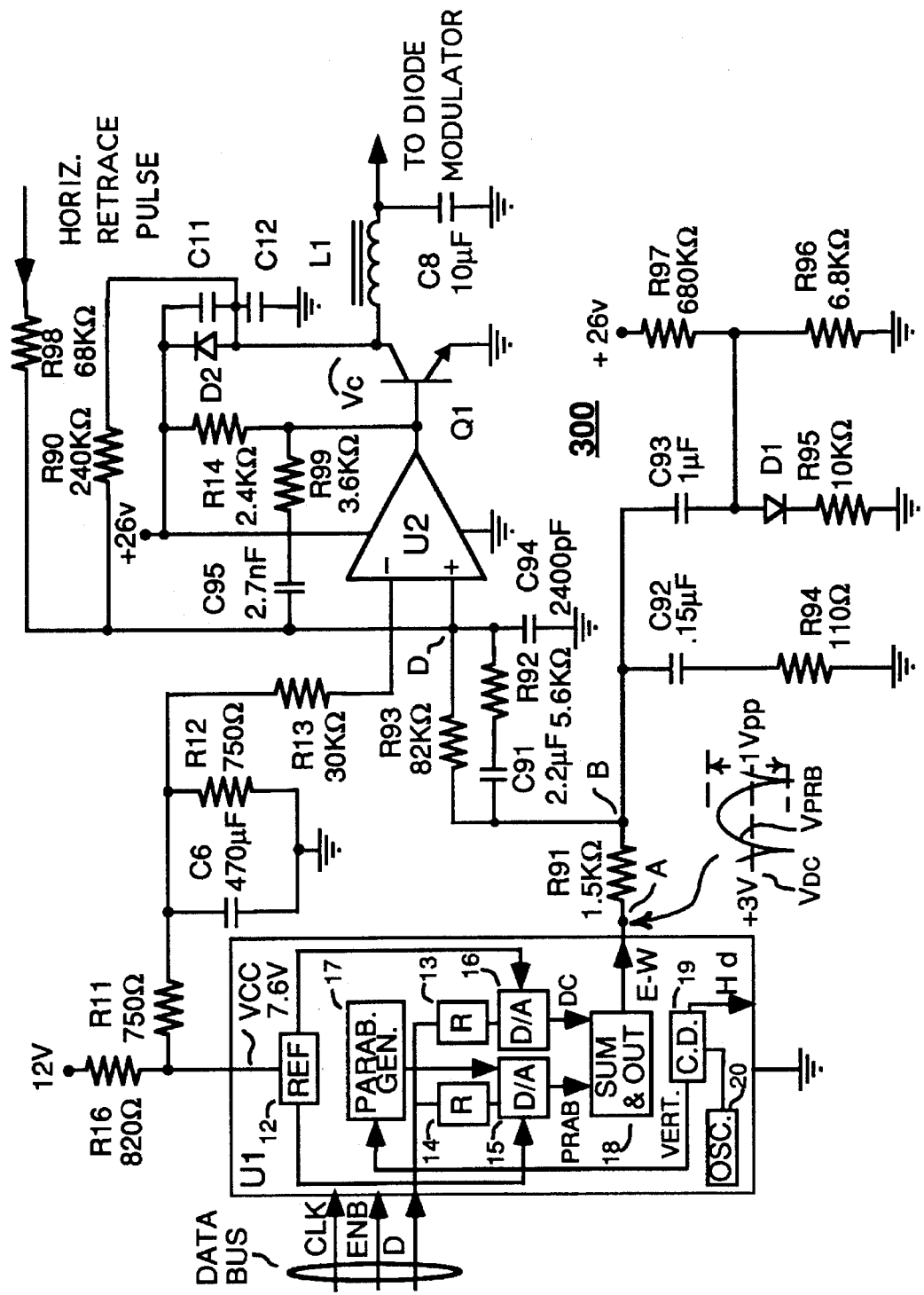
FIG. 4 shows an alternative asymmetrical parabolic waveform shaping embodiment.

FIG. 4 shows an embodiment where vertically varying horizontal deflection distortions are advantageously corrected by asymmetrical correction circuit 300 which employs a network having a non-linear transfer characteristic. Capacitor C92 and resistor R94 form a low impedance path to ground for horizontal frequency components coupled via resistor R92 and capacitor C91. Capacitor C93, AC couples the parabolic component of the East-West signal from the junction of resistor R91 and capacitor C92 to the anode of diode D1 and the junction of resistors R97 and R96. Resistors R97 and R96 form a voltage divider with resistor R97 connected to a 26 volt supply and resistor R96 connected to ground. The junction of the resistors R97 and R96 provides a positive bias potential to the anode of diode D1, however this potential is insufficient to cause diode D1 to conduct. Diode D1 cathode is coupled to ground via resistor R95. When the amplitude of the AC coupled parabolic waveform plus the positive bias provided by resistors R97 and R96 exceeds the cut in potential of diode D1, a potential divider is formed by resistors R91 and R95. When diode D1 conducts, additional AC parabola signal current is drawn from IC U1 via resistor R91 thus reducing the amplitude of the waveform at point B. Resistor R95 determines the degree of attenuation introduced when diode D1 conducts.

Figure 5:
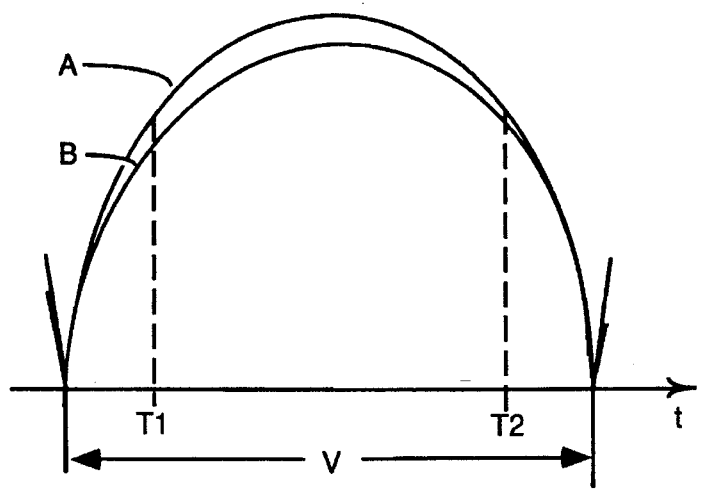
FIG. 5 shows the result of network 300 in FIG. 4.

Asymmetrical shaping of the parabolic waveform results from the time constant "tc", of the AC coupling formed by capacitor C93 and resistor R96, and the positive bias applied to diode D1 anode. Time constant "tc" is short when compared to the period of the parabola, approximately ⅓, which causes the parabola to be partially differentiated at the anode of diode D1. When the parabola charges capacitor C93, the positive differentiated signal adds to the positive bias and, when the amplitude is sufficient, causes diode D1 to conduct. At the peak of the parabola the derivative changes polarity and current is removed from capacitor C93. This discharge current is supplied by the bias circuit R96 and R97, since diode D1 can not conduct in the reverse direction. Hence, with the bias current charging the capacitor, diode D1 ceases conduction at a higher parabola voltage than that which caused conduction. Thus, the attenuation produced by diode D1 and resistor R95 results in an asymmetrical parabolic correction waveform. In FIG. 5 waveform A depicts the East-West vertical rate parabolic waveform at terminal point A. Waveform B of FIG. 5 depicts the East-West vertical rate parabolic waveform at the terminal point B subject to asymmetrical shaping due to circuit 300. In FIG. 5, time ordinate T1 illustrates a shape or amplitude difference between the rising edges of waveforms A and B. At time ordinate T2 of FIG. 5, waveforms A and B have very similar amplitudes.

What is claimed is:

1. A deflection apparatus comprising:

a horizontal deflection amplifier and a vertical deflection amplifier for generating deflection currents in horizontal and vertical deflection coils respectively, to form a scanned raster having asymmetrical pincushion distortion;

a deflection waveform modulation circuit having a modulation input and having an output coupled to said horizontal deflection amplifier and said horizontal deflection coil to generate a corrective current therein;

a source of a vertical frequency modulation signal, having a period comprising a first interval with a first waveform shape and a second interval with a second waveform shape where said first waveform and said second waveform are symmetrically shaped and of equal magnitude; and, means coupled to said source for altering the shape of at least one of said first and second waveform shapes to generate an asymmetrically shaped modulation signal coupled to said input of said waveform modulation circuit to substantially correct said raster.

2. The apparatus of claim 1, wherein said modulation signal comprises a parabolic shaped signal.

3. The apparatus of claim 1, wherein said means for altering said at least one shape comprises a network having a non-linear transfer characteristic.

4. The apparatus of claim 3, wherein said network attenuates an amplitude of said first waveform shape during said first interval relative to an amplitude of said second waveform shape during said second interval.

5. The apparatus of claim 4, wherein said network further comprises a resistive potential divider coupled to a diode to provide a voltage bias insufficient to forward bias said diode.

6. The apparatus of claim 5, wherein said diode is coupled in series with a resistor, said resistor determining said attenuation of said network.

7. A deflection apparatus for a video display comprising:

a horizontal deflection amplifier;

a deflection waveform modulation circuit coupled to said deflection amplifier for deflection waveform correction;

a source of a vertical rate modulation signal, having a waveform shape occurring substantially between vertical retrace intervals; and, an amplifier coupled to said source for amplifying said modulation signal, said amplifier having a feedback network for generating at an output, a signal having a waveform shape asymmetrically occurring between said vertical retrace intervals, said signal being coupled to said waveform modulation circuit for correction of an asymmetrical distortion in said display.

8. The apparatus of claim 7, wherein said signal having a waveform shape asymmetrically occurring between said vertical retrace intervals being delayed in time relative to said modulation signal.

9. The apparatus of claim 7, wherein said modulation signal comprises a vertical rate parabolic signal.

10. The apparatus of claim 7 wherein said feedback network is coupled to produce negative feedback.

11. The apparatus of claim 10, wherein said feedback network has a frequency selective transfer characteristic.

12. The apparatus of claim 11, wherein said frequency selective transfer characteristic produces asymmetrical positioning of cuspidal ends of said parabolic signal with respect to a vertical retrace period.

13. The apparatus of claim 10, wherein said feedback network comprises a series coupled combination of a resistor and a capacitor, said combination being coupled in parallel with a second resistor.

14. The apparatus of claim 7, wherein said deflection waveform modulation circuit comprises a diode modulator circuit.

15. The apparatus of claim 7, wherein said source for generating a modulation signal comprises an integrated circuit.

16. A video display apparatus comprising:

a horizontal deflection coil;

a vertical deflection coil;

a horizontal deflection amplifier and a vertical deflection amplifier generating deflection current in said horizontal and said vertical deflection coils respectively and producing a scanned raster having asymmetrical east west pincushion distortion;

a deflection waveform modulation circuit having an input and having an output coupled to said horizontal deflection coil and generating a corrective current therein;

a source of a vertical frequency modulation signal having a period comprising a first interval with a first waveform shape and a second interval with a second waveform shape, said first waveform and said second waveform having substantially similar shape and magnitude; and, a network having a non-linear transfer characteristic coupled to said source for altering said shape of at least one of said first and second waveform shapes generating a dissimilarly shaped modulation signal, said non-linear transfer characteristic being generated by a diode having a biasing voltage, insufficient for conduction, determined by a resistive potential divider, said dissimilarly shaped modulation signal being coupled to said input of said deflection waveform modulation circuit, substantially correcting said raster distortion.

17. A deflection apparatus for a video display comprising:

a horizontal deflection amplifier;

a deflection waveform modulation circuit coupled to said deflection amplifier for deflection waveform correction;

a source of a vertical rate parabolic modulation signal, having waveform cusps occurring during a vertical retrace period; and, an amplifier coupled to said source for amplifying said modulation signal, said amplifier having a negative feedback network having a frequency selective transfer characteristic and generating said modulation signal as an output, shifted in time, said waveform cusps occurring partially during said vertical retrace interval and a trace interval, said output signal being coupled to said waveform modulation circuit for correction of an asymmetrical distortion in said display.

18. A deflection apparatus for a video display comprising:

a deflection amplifier;

a deflection waveform modulation circuit coupled to said deflection amplifier;

a source for generating a vertical rate parabolic modulation signal; and, a second amplifier coupled to said source for amplifying said modulation signal, said amplifier having a negative feedback network comprising a series coupled combination of a resistor and a capacitor, said combination being coupled in parallel with a second resistor, said network generating an asymmetric vertical rate parabolic modulation signal, said asymmetric modulation signal being coupled to said waveform modulation circuit for correction of an asymmetric distortion in said display.

19. The deflection apparatus of claim 1, wherein said deflection waveform modulation circuit comprises an output amplifier having an output coupled to said horizontal deflection amplifier, and an input coupled to an output of an input amplifier, said input amplifier receiving said symmetrically shaped vertical frequency modulation signal and generating therefrom said asymmetrically shaped vertical frequency modulation signal for coupling to said output amplifier.

* * * * *